United States Patent
Adrian et al.

(10) Patent No.: US 6,811,156 B2
(45) Date of Patent: Nov. 2, 2004

(54) SEAL FOR HYDRAULICALLY SEALING A PISTON ROD

(75) Inventors: Adolf Adrian, Ennepetal (DE); Andreas Nevoigt, Hagen (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/212,297

(22) Filed: Aug. 2, 2002

(65) Prior Publication Data

US 2003/0042687 A1 Mar. 6, 2003

(30) Foreign Application Priority Data

Sep. 5, 2001 (DE) .......................................... 101 43 469

(51) Int. Cl.[7] .............................. B60J 11/236; F16J 9/00; F16J 9/20
(52) U.S. Cl. .......................... 277/435; 277/436; 277/437; 277/908
(58) Field of Search .................................. 277/434, 435, 277/436, 437, 438, 439, 908

(56) References Cited

U.S. PATENT DOCUMENTS

| | | | | |
|---|---|---|---|---|
| 3,057,630 A | * | 10/1962 | Sneed | 277/558 |
| 3,601,419 A | * | 8/1971 | Fern | 277/436 |
| 4,239,244 A | * | 12/1980 | Brent | 277/584 |
| 4,262,915 A | * | 4/1981 | Williams | 277/560 |
| 4,570,944 A | * | 2/1986 | Traub | 277/572 |
| 4,709,932 A | * | 12/1987 | Edlund et al. | 277/550 |
| 5,257,432 A | * | 11/1993 | Duke | 15/104.04 |
| 5,507,505 A | * | 4/1996 | von-Arndt et al. | 277/560 |
| 5,531,299 A | * | 7/1996 | Bataille | 188/322.17 |

* cited by examiner

*Primary Examiner*—Anthony Knight
*Assistant Examiner*—Vishal Patel
(74) *Attorney, Agent, or Firm*—Max Fogiel

(57) ABSTRACT

A seal for hydraulically sealing a piston rod that travels axially into and out of a housing, preferably in a hydraulic dashpot. The seal comprises a preferably resilient-plastic sealing component (5). The sealing component is provided with one or more sharp ridges (10, 11, & 12) that rest against the piston rod, is tensioned across an elastomeric component (8), and is radially and axially secured along with the latter in a seal holder (2). The sealing component has an axial cylindrical wall (6) and a radial annular flange (7). The wall rests snug against the piston rod. The elastomeric component is annular and is provided with an inner surface (9) that tapers in toward the center of the housing and that the wall rests against. The outer surface of the elastomeric component is accommodated subject to radial tension in a setback (13) in the seal holder. The object is a seal that will satisfactorily prevent the escape of fluid at low temperatures, whereby the sealing component will be subjected to minimal force at high temperatures. The radial tension accordingly varies along the axial height (16) of the elastomeric component.

4 Claims, 1 Drawing Sheet

SEAL FOR HYDRAULICALLY SEALING A PISTON ROD

BACKGROUND OF THE INVENTION

The present invention concerns a seal for hydraulically sealing a piston rod. Piston-rod seals of this genus are preferably employed to seal the projecting end of an oscillating piston rod in a hydraulic dashpot. The hydraulic fluid is highly compressed and must be effectively contained without resulting in excess friction between the piston rod and the seal.

German 8 201 327 U1 discloses a piston-rod seal of this genus. The device has a drawback, however, in that it can be effective at low temperatures only if it is provided with a sealing component that rests against an elastomeric component and is powerfully forced into position at high temperatures. The result is considerable friction and inefficient operation on the part of the piston rod.

SUMMARY OF THE INVENTION

The object of the present invention is accordingly a piston-rod seal of the aforesaid genus improved to the extent that it will effectively prevent the leakage of hydraulic fluid at low temperatures while subjecting the sealing component to as little force as possible at high temperatures.

The major advantage of the present invention is that the elastomeric component is specifically designed to force the sealing component against the piston rod to an extent that depends on the prevailing temperature.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
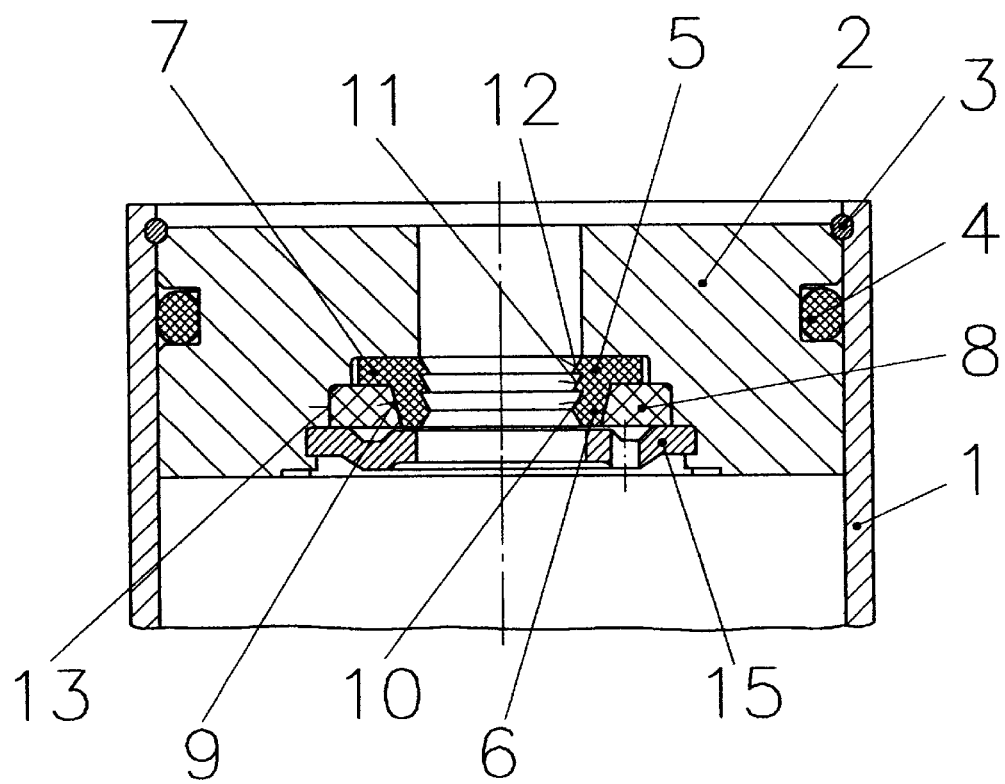
FIG. 1 is a section through where the piston rod in a dashpot projects out of the cylinder and FIG. 2 is a larger-scale illustration of an elastomeric component not yet inserted into the piston-rod seal.

The present embodiment of a piston-rod seal is intended to seal off an oscillating piston rod 18 as it travels into and out of the open end of the cylinder 1 in a hydraulic dashpot. FIG. 1 is a large-scale depiction of the area. A seal holder 2 is secured to the open end of cylinder 1 by a tensioned O ring 3. A gasket 4 seals seal holder 2 off against the cylinder.

The actual piston-rod seal, which seals the piston rod 18 off from seal holder 2, consists of a sealing component 5 with an axial cylindrical wall 6 and with a radial annular flange 7. Wall 6 surrounds the piston rod like a jacket, and flange 7 is directly adjacent to it. Wall 6 is supported radially outward by a gasket-shaped elastomeric component 8. The outer surface of wall 6 rests against the inner surface 9 of elastomeric component 8. Inner surface 9 tapers in toward the center of the housing constituted by cylinder 1, and the outer surface of the wall tapers at the same angle.

At least one sharp ridge 10 extends along the inner surface of sealing component 5 and comes to rest against the piston rod. This inner surface is also provided with additional sharp ridges 11 and 12 that come to rest against the rod either simultaneously or successively.

Elastomeric component 8 rests radially and radially tensioned in a setback 13. Sealing component 5 on the other hand is maintained in position by resting against the inner surface 9 of elastomeric component 8.

A resilient washer 15 accommodated in a groove 14 secures sealing component 5 and elastomeric component 8 radially.

Figure 2:
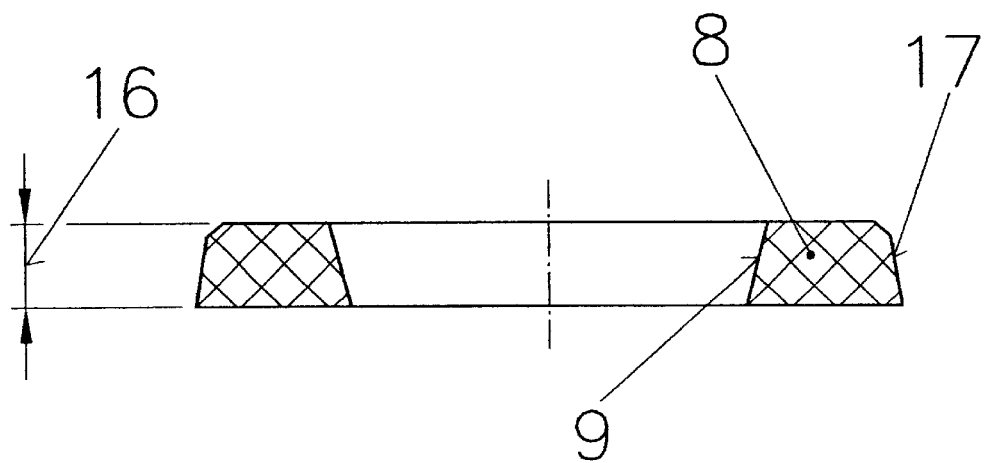

FIG. 2 is a transverse section through elastomeric component 8 prior to its insertion into setback 13. The outer surface 17 of the uncompressed component is conical over most of its axial height 16. When component 8 is forced into the at least approximately cylindrical setback 13 in seal holder 2, the radial tension, expressed in the form of a strain extending as far as the inside diameter, will increase along the height 16 of elastomeric component 8 and into the housing represented by cylinder 1. Sealing component 5 will accordingly be satisfactorily maintained in position even at temperatures as low as −40°, and no fluid will leak out between the piston rod and the cylinder.

The particular plastic or elastomer employed will of course be determined by one of skill in the art.

The sealing component 5 has an axial cylindrical wall 6 and a radial annular flange 7. The wall 6 rests snug against the piston rod 18. The elastomeric component 8 is annular and is provided with an inner surface 9 that tapers in towards the center of the housing.

LIST OF PARTS 1. cylinder
2. seal holder
3. O ring
4. gasket
5. sealing component
6. wall
7. flange
8. elastomeric component
9. inner surface
10. ridge
11. ridge
12. ridge
13. setback
14. groove
15. washer
16. height
17. outer surface

What is claimed is:

1. A seal for hydraulically sealing a piston rod that travels axially into and out of a housing in a hydraulic dashpot, and comprising: a resilient-plastic sealing component having at least one sharp ridge resting against the piston rod; an elastomeric component, said sealing component being tensioned across said elastomeric component and being radially and axially secured along with said elastomeric component in a seal holder; said sealing component having an axial cylindrical wall and a radial annular flange said wall resting against said piston rod, said elastomeric component being annular and having an inner surface tapering in toward a center of the housing and resting against said wall; said elastomeric component having an outer surface subject to radial tension in a setback in said seal holder, said radial tension varying along an axial height of said elastomeric component, said elastomeric component being axially tensioned with varying stressing by pressing said elastomeric component into a cylindrical recess after being originally conically-shaped and being deformed by said pressing into said cylindrical shape.

2. The seal as defined in claim 1, wherein the radial tension of said sealing component increases toward the top of the wall.

3. The seal as defined in claim 1 wherein said radial tension increases continuously.

4. A seal for hydraulically sealing a piston rod that travels axially into and out of a housing in a hydraulic dashpot, and comprising: a resilient-plastic sealing component having at least one sharp ridge resting against the piston rod; an elastomeric component, said sealing component being tensioned across said elastomeric component and being radially and axially secured along with said elastomeric component in a seal holder; said sealing component having an axial cylindrical wall and a radial annular flange, said wall resting against said piston rod, said elastomeric component being annular and having an inner surface tapering in toward a center of the housing and resting against said wall; said elastomeric component having an outer surface subject to radial tension in a setback in said seal holder, said radial tension varying along an axial height of said elastomeric component, said outer surface of said elastomeric component being conical prior to insertion of said elastomeric component into the seal holder, said elastomeric component resting after insertion against a substantially cylindrical surface of said seal holder, said outer surface of said elastomeric component having a shorter diameter, said cylindrical surface having a diameter substantially as long as said shorter diameter of said outer surface of said elastomeric component.

* * * * *